Sept. 13, 1966  V. L. FRANTZ  3,272,219
CHECK VALVE HAVING HEAD AND SEAT IN REMOVABLE CARTRIDGE
Filed Oct. 6, 1965  2 Sheets-Sheet 1

Inventor:
Virgil L. Frantz
By Wilmer Mechlin
his Attorney

Sept. 13, 1966    V. L. FRANTZ    3,272,219
CHECK VALVE HAVING HEAD AND SEAT IN REMOVABLE CARTRIDGE
Filed Oct. 6, 1965    2 Sheets-Sheet 2
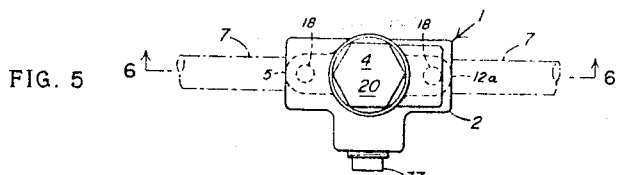
FIG. 5
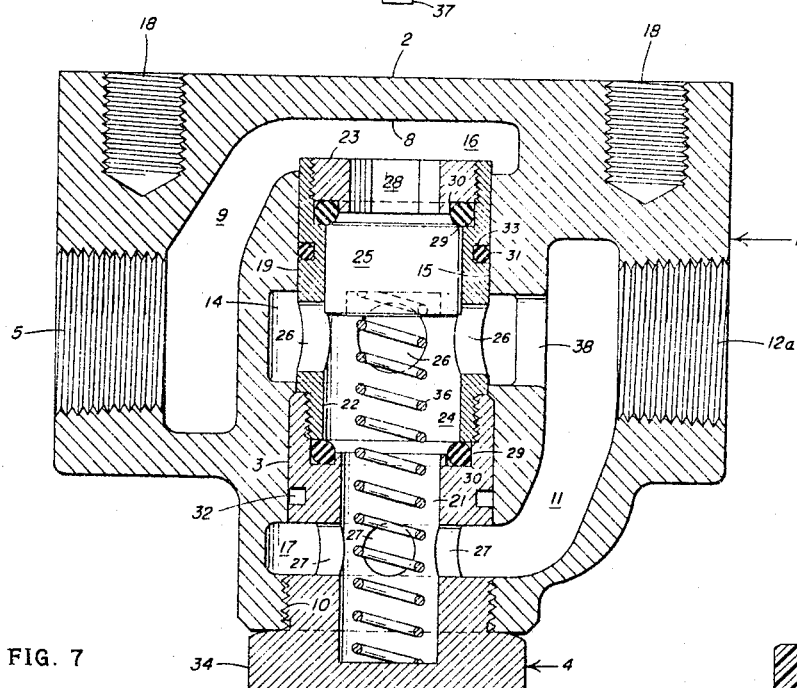
FIG. 6
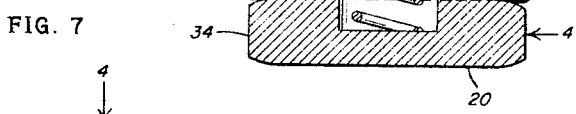
FIG. 8
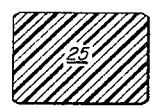
FIG. 10
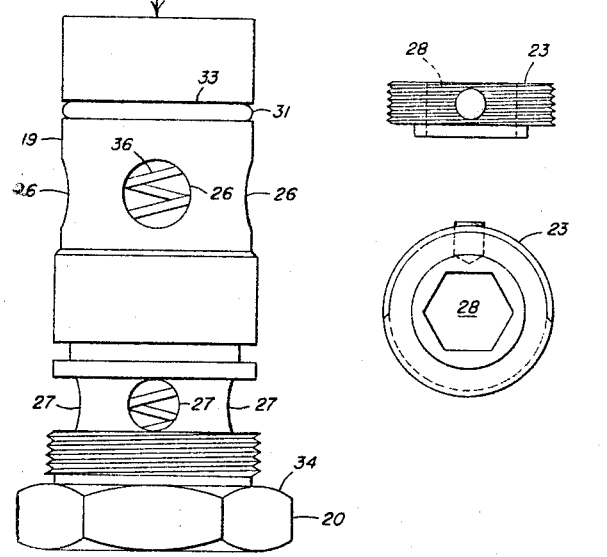
FIG. 7
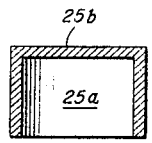
FIG. 11
FIG. 9
Inventor:
Virgil L. Frantz
By Wilmer Mecklin
his Attorney

United States Patent Office 3,272,219
Patented Sept. 13, 1966

3,272,219
CHECK VALVE HAVING HEAD AND SEAT IN REMOVABLE CARTRIDGE
Virgil L. Frantz, Salem, Va., assignor to Graham-White Sales Corporation, Salem, Va., a corporation of Virginia
Filed Oct. 6, 1965, Ser. No. 493,502
7 Claims. (Cl. 137—112)

This invention relates to check valves. This application is a continuation-in-part of my copending application Ser. No. 224,461, filed Sept. 18, 1962, now abandoned.

The primary object of the invention is to provide an improved two-way check valve for enabling a device to be actuated from either of two locations.

Another object of the invention is to provide an improved check valve wherein the parts subject to wear are carried by and removable as a unit with a cartridge from the body of the valve, thereby enabling the valve to be serviced without disturbing any air connections to the body.

An additional object of the invention is to provide an improved check valve wherein the valving of actuating air to a device actuated thereby is automatically controlled by a light-weight shuttle of suitable plastic or hollow metal which is reciprocable within a valve chamber in the body of the valve and cushioned in its movements and sealed at the limits thereof by sealing elements at opposite ends of the chamber, thereby minimizing wear and correspondingly increasing the effective service life of the valve.

A further object of the invention is to provide a cartridge type two-way check valve which is convertible into a one-way check valve by a simple modification of the valve body.

Another object of the invention is to provide an improved check valve which, while requiring a return spring in its one-way form, may be used in its two-way form either with or without such a spring.

Other objects and advantages of the invention will appear hereinafter in the detailed description, be particularly pointed out in the appended claims and be illustrated in the accompanying drawings in which:

FIGURE 5 is a front elevational view of the check valve of this invention modified for use as a one-way valve;

FIGURE 6 is a horizontal sectional view on the scale of FIGURE 4 taken along lines of 6—6 of FIGURE 5;

FIGURE 7 is a side view of a cartridge usable in the valve of either embodiment;

FIGURE 8 is a side view of the plug for the inner end of the cartridge removed from the latter;

FIGURE 9 is a front end view of the plug of FIGURE 8;

FIGURE 10 is a central vertical sectional view of the shuttle of FIGURE 4 removed from the valve; and FIGURE 11 is a view corresponding to FIGURE 10 of an alternate form of shuttle.

Figure 1:
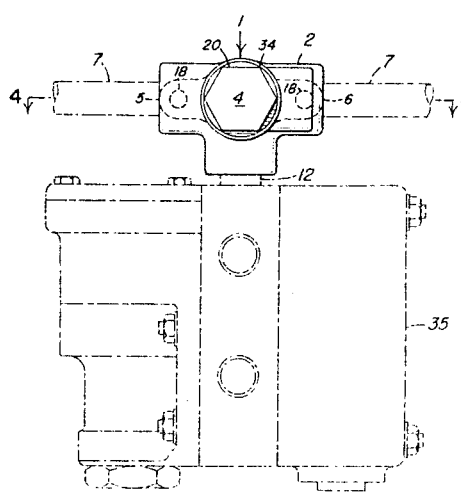
FIGURE 1 is a front elevational view of a preferred two-way embodiment of the check valve of the present invention in a typical installation.

Referring now in detail to the drawings in which like reference characters designate like parts, the improved check valve of the present invention, while usable generally for controlling the direction of fluid flow, is particularly designed for use in installations calling for a check valve having readily replaceable operating parts or capable of automatically checking flow in either of a plurality of directions.

Designated generally as 1, the improved check valve in each of the illustrated embodiments is comprised of a metal body 2 having a preferably cylindrical, central bore or aperture 3 open at one end, a plurality of ports communicating or connecting at spaced positions with the bore, and a metal cartridge 4 carrying the operating parts of the valve and removably insertable therewith as a unit into the bore.

Figure 2:
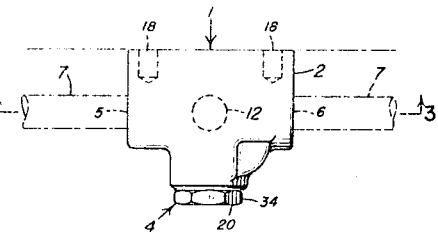
FIGURE 2 is a plan view of the valve of FIGURE 1.
Figure 3:
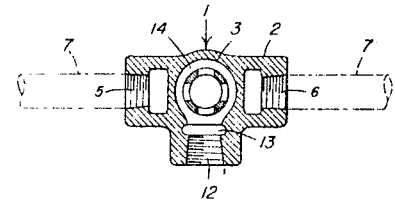
FIGURE 3 is a vertical sectional view taken along lines 3—3 of FIGURE 2.
Figure 4:
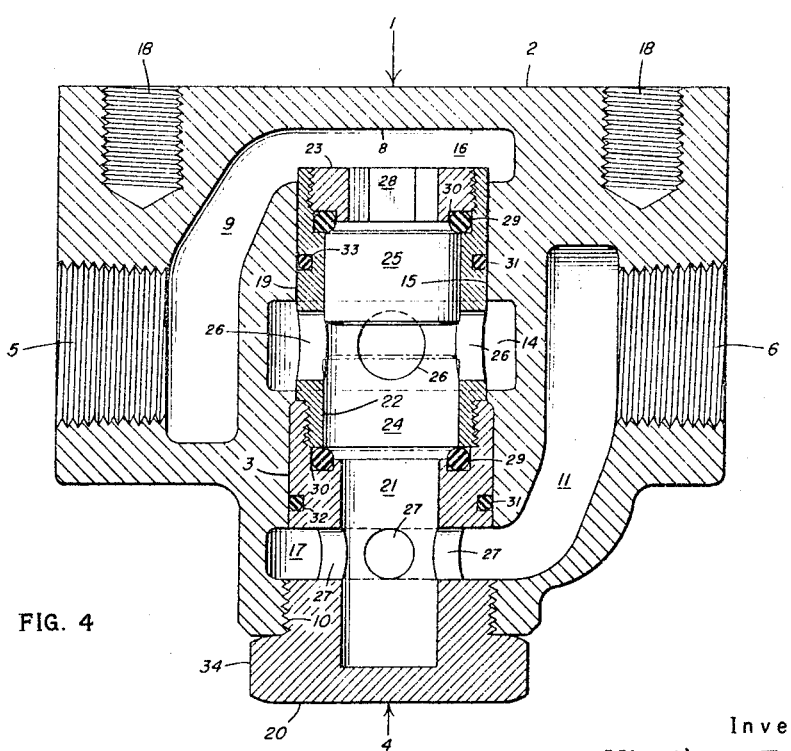
FIGURE 4 is a horizontal sectional view on an enlarged scale taken along lines 4—4 of FIGURE 1.

In the embodiment or form illustrated in FIGURES 1-4 in which it is a two-way check valve, the valve 1, as in a typical installation, has a pair of inlets or inlet ports 5 and 6, each connected by a line 7 to one of a pair of spaced operating valves (not shown), such as those found in the end cabs of a locomotive or locomotive consist. Of these two inlet ports, one 5 communicates with or connects to the closed inner end 8 of the bore 3 through a passage or way 9, and the other 6 communicates with or connects to the bore adjacent the latter's open outer end 10 through a passage or way 11 separated from the first and connectable thereto only through the bore. To pass fluid entering from either of the inlet ports 5 and 6, the valve has a single or common outlet or outlet port 12, which, in the preferred arrangement in which the inlet ports are diametrically opposed or oppositely disposed, conveniently is disposed substantially normal to and intermediate the inlet ports. The outlet port 12 in its turn communicates with or connects to the bore 3 through a passage or way 13 preferably opening inwardly onto an annular groove or recess 14, which in turn interrupts and opens inwardly onto the side wall 15 of the bore intermediate and spaced axially from the points or positions at which the bore and the inlet passages 9 and 11 connect. The inlet passages 9 and 11 also preferably have inner terminals 16 and 17, which, like the annular groove 14 serving as the inner terminal of the outlet passage 13, not only connect to but are generally annular and surround or encircle the adjoining part of the bore.

Constructed in the above manner, the body 2 is adapted for permanent mounting on a suitable base (not shown), conveniently by providing it with bolt-receiving sockets 18, and for permanent connection of its several ports 5, 6 and 12 to appropriate air lines, by depending upon the removable cartridge 4 to supply the parts by which the valve is enabled alternately or selectively to connect one of the inlet ports to the outlet port and simultaneously check or block flow of fluid to the other inlet port and from the latter to the outlet port. To this end, as well as to afford ready access to parts mounted within or internally of it, the cartridge 4 preferably is formed of two coaxial threadedly connected main or inner and outer parts, the inner part 19 an open-ended sleeve normally spanning or extending across the annular groove 14 and projecting or extending inwardly to the inner 16 of the inlet terminals, and the other or outer part 20 a cap threaded over the outer end of the sleeve. Closed at its outer end, except for an inwardly opening central cavity 21 of lesser diameter in and extending outwardly of the cap to or beyond the point or position of the outer inlet terminal 17, the central aperture 22 of the sleeve 19 also is partly enclosed at its inner end by a centrally orificed or apertured plug 23 threaded into the inner end of the sleeve. Between or intermediate the axial or longitudinal limits imposed by the cap 20 and plug 23, the central aperture 22 in the sleeve 19 provides a cylindrical valve chamber or compartment 24 in which slides a reciprocable shuttle or valve element 25, the longitudinal or axial extent of movement and dimension of which is such as alternately to expose at its opposite ends radial drillings or openings 26 through the side of the sleeve onto the terminal groove 14 of the outlet passage 13. The central cavity 21 in the cap 19, opening into one end of the chamber 24, is connected to the inner terminal 17 of the related or outer inlet passage 11 by radial drillings or openings 27, and the central orifice 28 through the plug 23, which opens outwardly into the adjoining end of the chamber, opens inwardly onto the inner terminal 16 of the inner inlet passage 9. Thus, the shuttle 24 at opposite ends of its movement is adapted alternately to connect the inlet ports 5 and 6 to the common outlet port 12.

The construction and composition of the shuttle 25 are very important to the effectiveness and longevity of the valve, a non-solid-metal, cylindrical shuttle of solid "Nylon" or like suitable plastic which is light and durable and to a degree self-lubricating, being ideal for the purpose. The desired lightness and durability can also be obtained by using as the non-solid-metal shuttle, a hollow shuttle of stainless steel or like suitable durable material. Designated as 25a, the alternate hollow metal shuttle conveniently is formed by boring a solid metal cylinder from one end to leave a thin-walled hollow cylinder which, when assembled, is open at its lower end and closed at its other or upper end by a thin upper end wall 25b for blocking direct flow therethrough.

Although, due to its light weight and correspondingly low mass, either a plastic or hollow metal shuttle would protect the cartridge 4 from wear, it, itself, would be subject to excessive wear at its ends were it free to pound against the cap and plug. To prevent such wear the shuttle 25 or 25a is cushioned and protected from direct end contact with the cap and plug at the opposite limits of its movement by a pair of O-rings 29 of rubber or like resilient material, one at either end of the valve chamber 24. Interposed between and spacing the ends of the shuttle from the cap and plug at opposite limits of the shuttle's movement, the resilient O-rings or annular cushions conveniently fit in seats 30 in opposite ends of the chamber 24 about the end openings thereof, one O-ring in the cap 20 about the inner end of the cavity 21 and the other in the sleeve 19 adjacent the latter's inner end, with the outer O-ring conveniently held in place by the sleeve and the inner by the plug 23. The sealing action of the cushioning O-rings 29 internally of the cartridge 4 preferably is duplicated externally by a pair of sealing O-rings 31 seated in peripheral grooves 32 and 33 in the cap 20 and sleeve 19, respectively, at opposite sides of the radial drillings 26 in the sleeve. In the assembled position of the cartridge 4, these latter O-rings 31 straddle or embrace the annular groove 14 and at opposite sides thereof sealingly engage the side wall 15 of the bore 3 for preventing leakage of fluid between the inlet and outlet ports around the outside of the cartridge.

The cap 20 is threaded into the bore 3, outwardly of the outer inlet terminal 17, and has an enlarged head 34 at its outer end seating against the body 2 for providing an air-tight seal between the head and the body and limiting the projection of the cartridge 4 into the bore 3. Also, the head 34 of the cap 20 and central orifice 28 in the plug are of hex- or other out-of-round configuration to accept turning tools and the radial drillings 26 in the sleeve serve the same purpose. Consequently, the cartridge 4 can readily be applied to and removed from the body 2 and, once removed, affords access to the external O-rings 31 and is readily disassemblable for access to the internal O-rings 29 and shuttle 25 or 25a. By virtue of the cartridge 4, the only parts or components of the check valve subject to wear in service therefore are easily removed for repair or replacement without detachment of the air lines from the body 2 or of the latter from its mounting.

The readiness with which the cartridge 4 can be removed from the body 2 and itself disassembled is at least matched by the effectiveness of the shuttle 25 or 25a in selectively controlling flow of air or other fluid through the valve when the cartridge is seated in the bore 3. With the surfaces presented from opposite ends of the shuttle equal in area and exposed to pressure of air or other fluid entering the ends of the valve chamber 24 from the inlet ports 5 and 6, air introduced through either end of the chamber will shift, force or displace the shuttle to the chamber's other end, if it was not already in that position, and the shuttle will remain in that position even though in the interim its other end is exposed to air under the same pressure. Thus, so long as the operating valve connected to one of the inlet ports 5 and 6 is initially closed, operation of the other operating valve will cause air to flow to the related inlet port and within the body 2 to the outlet port, there to actuate an air-actuated device, such as the check-bleed valve assembly indicated at 35 in FIGURE 1 and illustrated in detail in Frantz Patent No. 3,036,597, issued May 29, 1962. Thereafter, while the second operating valve is open, the shuttle will block flow of air between the first operating valve and the outlet port and effectively prevent the first valve from interfering with actuating of the related air-actuated device. This inoperativeness of the first valve either to unseat the shuttle or to bleed the line, ends with closing of the second valve, whereafter operation of either operating valve will repeat the cycle.

In the second embodiment of FIGURES 5–9 the two-way check valve of FIGURES 1–4 has been modified to adapt it for use as a one-way check valve. This modification involves no change in the cartridge or casing 4 comprised of the cap 20, sleeve 19, and plug 23 but does require minor changes to be made in the cartridge unit, a term herein used to encompass the cartridge proper and the various components or parts carried by it. These changes are the provision of a coil or like return spring 36 seated in the lower end of the plastic shuttle 25 or alternate hollow metal shutter 25a, for normally biasing or urging the shuttle toward one end of the valve chamber 24 and the elimination of one of the external or outside O-rings 31, here the outer, seating in the groove 32 in the cap 20, the sealing function of which no longer need be performed at its location.

The elimination of one of the outside O-rings 31 is consequent upon eliminating or rendering inoperative one of the several inlet and outlet ports 5, 6 and 12, the modified valve, as a one-way check valve, being restricted in its capabilities to preventing fluid from flowing through the valve except one way or in one direction. In the illustrated embodiment the port selected to be rendered inoperative is the outlet port 12 of the first embodiment, this being accomplished simply by plugging the port by a plug 37. However, were no other change made, the valve would be rendered inoperative, as the shuttle 25 or 25a would prevent connection through the cavity 21 and the valve chamber 24 of the two inlet ports, one of which, with the plugging of the outlet port of the first embodiment, now must perform for the remaining inlet port the function of an outlet port. Accordingly, in the modification, the passage 11, which connected the former inlet and now outlet port 12a to the cavity, is by-passed by forming in the body 2, as by drilling or coring during casting, a by-pass, drilling, way or passage 38 connecting the now outlet port to the groove 14 surrounding the midportion of the bore 3. With the by-pass 38, which, incidentally can readily be adapted for plugging in case it is desired to convert the modified valve to a two-way check valve, the inlet and outlet ports 5 and 12a, respectively, are initially disconnected within the cartridge 4 by the shuttle 25 or 25a and outside the cartridge by the remaining O-ring 31 and cannot be connected by introduction of pressure through outlet port 12a, but are connectable automatically if pressure is introduced through the inlet port 5.

Mention of the return spring 36 only in connection with conversion of the two-way valve of the first embodiment to the one-way valve of the second, is not to be taken as precluding in the two-way form the use of a similar return spring acting between one or the lower end of the shuttle 25 or 25a and the cap 20 or plug 23 at the adjoining end of the valve chamber 24. Ordinarily, such a return spring will not be used in the two-way form, but can be supplied if for any reason greater resistance to movement of the shuttle in one direction than the other is desired.

From the above-detailed description, it will be apparent that there has been provided an improved check valve, in which the parts subject to wear are part of a readily removable cartridge unit and which, while normally usable as a two-way check valve, is readily and simply modifiable for use as a one-way check valve. It should be understood that the described and disclosed embodiments are merely exemplary of the invention and that all modifications are intended to be included that do not depart from the spirit of the invention or the scope of the appended claims.

Having described my invention, I claim:

1. A check valve comprising a metal body having a bore, inlet and outlet ports in said body and communicating at spaced positions with said bore, and a cartridge unit removably inserted in said bore, said unit including a metal cartridge, a cylindrical chamber in said cartridge, said chamber having openings in opposite ends thereof and intermediate said ends and communicating through at least one end opening with an inlet port and through an intermediate opening with an outlet port, a lightweight non-solid-metal cylindrical shuttle reciprocable in said chamber between ends thereof and freely in at least one direction, and O-rings seated in opposite ends of said chamber about said end openings therein for alternately seating said shuttle, said O-rings spacing said shuttle from said chamber ends and cushioning the reciprocable movement thereof.

2. A check valve comprising a metal body having a bore, a plurality of inlet ports and an outlet port communicating at spaced positions with said bore, and a cartridge unit removably inserted in said bore, said unit including a metal cartridge, a cylindrical chamber in said cartridge, said chamber having openings in opposite ends thereof and intermediate said ends, and communicating through said end openings with said inlet ports and through said intermediate opening with said outlet port, a lightweight non-solid-metal cylindrical shuttle freely reciprocable in said chamber between said ends thereof, and O-rings seated in opposite ends of said chamber about said end openings therein for alternately seating said shuttle, said O-rings spacing said shuttle from said chamber ends and cushioning the reciprocable movement thereof.

3. A check valve comprising a metal body having a bore, an inlet port and an outlet port communicating at spaced positions with said bore, and a cartridge unit removably inserted in said bore, said unit including a metal cartridge, a cylindrical chamber in said cartridge, said chamber having openings in opposite ends thereof and intermediate said ends and communicating through one end opening with said inlet port and through said intermediate opening with said outlet port, a lightweight non-solid-metal shuttle consisting of a plastic cylinder reciprocable in said chamber between said ends thereof freely in one and against yieldable resistance in the other direction, and O-rings seated in opposite ends of said chamber for alternately seating said shuttle, said O-rings spacing said shuttle from said chamber ends and cushioning the reciprocable movement thereof.

4. A check valve comprising a metal body having a bore, inlet and outlet ports in said body and communicating at spaced positions with said bore, and a cartridge unit removably inserted in said bore, said unit including a metal cartridge, a cylindrical chamber in said cartridge, said chamber having openings in opposite ends thereof and intermediate said ends and communicating through at least one end opening with an inlet port and through an intermediate opening with an outlet port, a lightweight plastic cylindrical shuttle reciprocable in said chamber between ends thereof and freely in at least one direction, and O-rings seated in opposite ends of said chamber about said end openings therein for alternately seating said shuttle, said O-rings spacing said shuttle from said chamber ends and cushioning the reciprocable movement thereof.

5. A check valve comprising a metal body having a bore, inlet and outlet ports in said body and communicating at spaced positions with said bore, and a cartridge unit removably inserted in said bore, said unit including a metal cartridge, a cylindrical chamber in said cartridge, said chamber having openings in opposite ends thereof and intermediate said ends and communicating through at least one end opening with an inlet port and through an intermediate opening with an outlet port, a lightweight hollow metal cylindrical shuttle reciprocable in said chamber between ends thereof and freely in at least one direction, and O-rings seated in opposite ends of said chamber about said end openings therein for alternately seating said shuttle, said O-rings spacing said shuttle from said chamber ends and cushioning the reciprocable movement thereof.

6. A check valve comprising a metal body having a bore, inlet and outlet ports in said body and communicating at spaced positions with said bore, and a cartridge unit removably inserted in said bore, said unit including a metal cartridge, a cylindrical chamber in said cartridge, said chamber having openings in opposite ends thereof and intermediate said ends and communicating through at least one end opening with an inlet port and through an intermediate opening with an outlet port, a lightweight hollow stainless steel cylindrical shuttle reciprocable in said chamber between ends thereof and freely in at least one direction, and O-rings seated in opposite ends of said chamber about said end openings therein for alternately seating said shuttle, said O-rings spacing said shuttle from said chamber ends and cushioning the reciprocable movement thereof.

7. A check valve comprising a metal body having a bore, inlet and outlet ports in said body and communicating at spaced positions with said bore, and a cartridge unit removably inserted in said bore, said unit including a metal cartridge, a cylindrical chamber in said cartridge, said chamber having openings in opposite ends thereof and intermediate said ends and communicating through at least one end opening with an inlet port and through an intermediate opening with an outlet port, a lightweight hollow stainless steel cylindrical shuttle open at only one end, said shuttle being reciprocable in said chamber between ends thereof and freely in at least one direction, and O-rings seated in opposite ends of said chamber about said end openings therein for alternately seating said shuttle, said O-rings spacing said shuttle from said chamber ends and cushioning the reciprocable movement thereof.

References Cited by the Examiner

UNITED STATES PATENTS

| 2,627,388 | 3/1953 | Johnson | 137—112 X |
| 2,729,226 | 1/1956 | Jones | 137—112 |
| 2,761,463 | 9/1956 | Wagner | 137—112 |
| 3,007,485 | 11/1961 | Barker | 137—454.2 |
| 3,042,071 | 7/1962 | Van Tuyl | 137—454.5 |
| 3,107,681 | 10/1963 | May | 137—112 |
| 3,123,091 | 3/1964 | Elsey | 137—270 |
| 3,154,486 | 10/1964 | Weaver | 137—454.5 X |

WILLIAM F. O'DEA, *Primary Examiner.*

CLARENCE R. GORDON, *Examiner.*